June 4, 1929.　　　　E. EBERHART　　　　1,715,696
LAWN MOWER SHARPENER
Filed Aug. 27, 1925　　　　3 Sheets-Sheet 2

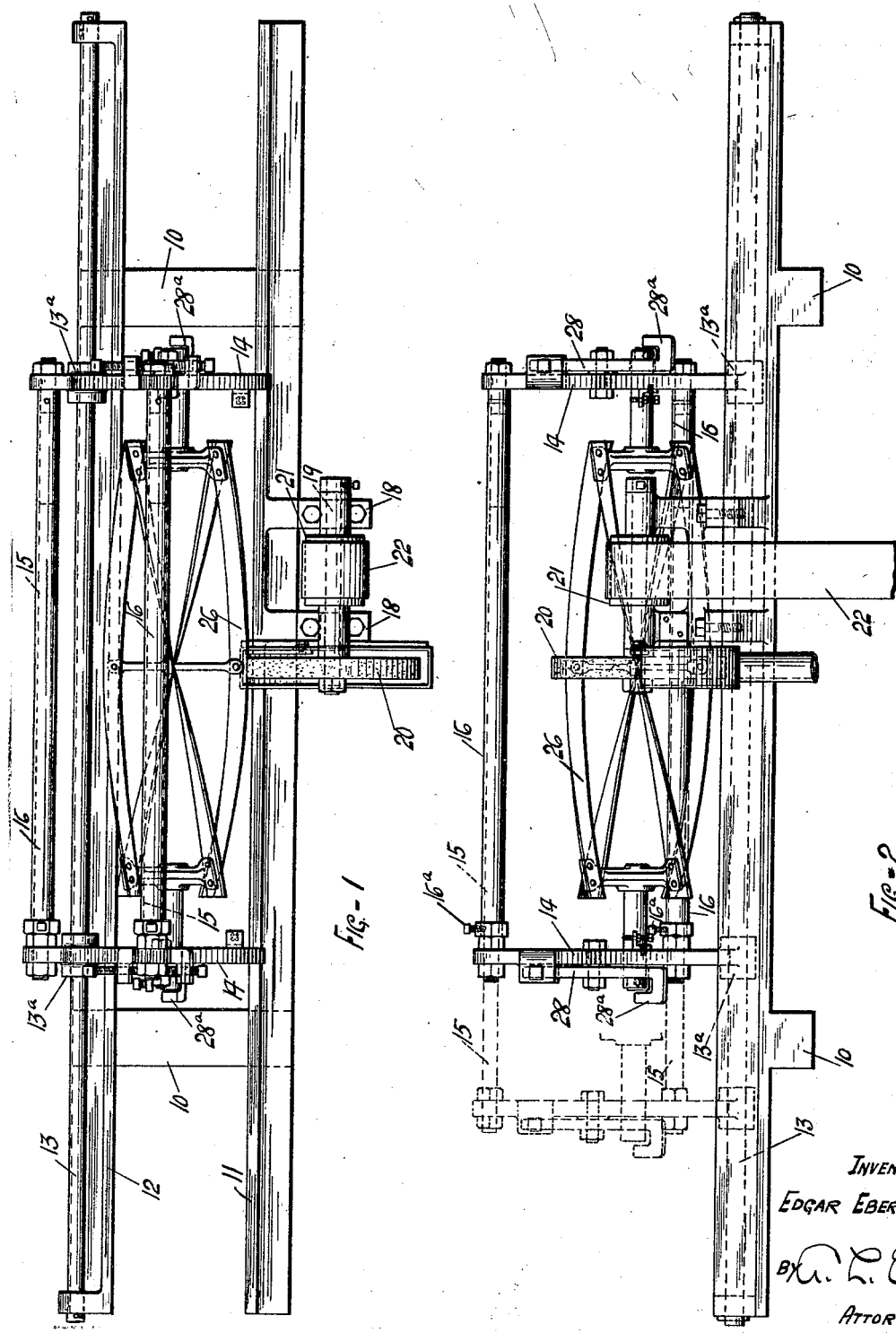

INVENTOR.
EDGAR EBERHART.
BY
ATTORNEY.

INVENTOR.
EDGAR EBERHART.
BY
ATTORNEY.

Patented June 4, 1929.

1,715,696

UNITED STATES PATENT OFFICE.

EDGAR EBERHART, OF ORRVILLE, OHIO.

LAWN-MOWER SHARPENER.

Application filed August 27, 1925. Serial No. 52,742.

This invention relates to lawn mower sharpeners, and has for its general object the provision of an improved lawn mower sharpener construction adapted for sharpening both the helical and straight blades of the mower in an easy and effective manner.

The above and other objects will be more readily understood by reference to the accompanying drawings, illustrating one embodiment thereof, and to the following brief description of the device shown therein. It is understood that the invention is not limited to the specific form thereof shown and described.

Of the accompanying drawings:

Figure 1 is a plan of device embodying the invention and illustrating the rotary cutter of a lawn mower therein;

Figure 2 is a front elevation thereof;

Figure 3:
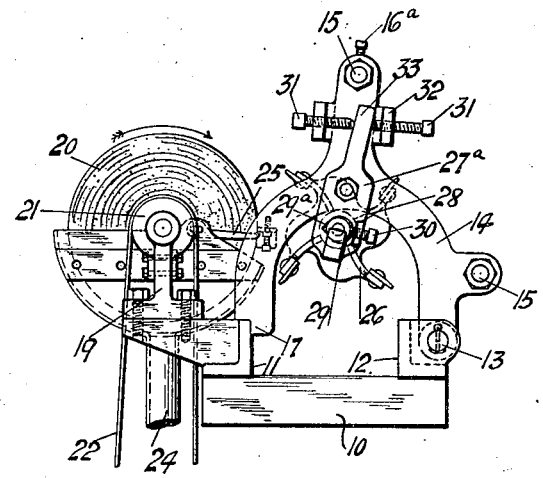
Figure 3 is an end elevation thereof.

Referring to the drawings, 10, 10 indicate suitable supports on which are mounted in parallel spaced apart relation a bar 11 and a bar 12, the latter having mounted thereon a rod 13 on which is slidably and pivotally mounted, as at 13ª, 13ª, a frame comprising separable end brackets 14, 14 adjustably secured together by rods 15, 15, telescoping in sleeves 16, 16, and adapted to be secured in adjusted relationships by set screws 16ª, 16ª, brackets 14 being formed as at 17, 17 so that the frame is slidable on bar 11 when in operative position for sharpening.

On bar 11 there are provided brackets 18, 18 in which is journaled a shaft 19 having thereon a grinder 20 with respect to which the above frame is slidable as a unit to move a blade mounted therein relatively of the grinder. Any suitable means may be employed to drive grinder 20, a pulley 21 being here shown which may be driven by a belt 22 connected to any suitable source of power. Mounted on one bracket 18 is a receptacle 23 for grindings, enclosing the lower portion of grinder 20, and from the bottom of which leads a conductor or chute 24 by which the grindings are removed from the machine.

Receptacle or casing 23 has a slot 23ª thereon on one side of grinder 20, so that a work rest 25 may be adjustably bolted thereon, rest 25 consisting in a finger adjusted so as to project forwardly of the grinder 20 sufficiently to provide a rest for the cutter blade being sharpened.

For mounting a rotary cutter such as indicated at 26 in the slidable frame, there is pivoted on each bracket 14 at 27ª an arm 28 having a cutter spindle receiving aperture 29 therein, aperture 29 being formed with a V-shaped portion 29ª whereby it is adapted rotatively to receive cutter spindles of various diameters, a set screw 30 being threaded into the aperture to position the spindle therein. Each arm 28 is formed with an upwardly bent portion 28ª on its lower end arranged to prevent endwise play of the rotary cutter in apertures 29. Arm 28 is adjustable toward and from the grinder to permit operation thereof on cutters of different diameters, a pair of set screws 31, 31 being threaded through the arms of a U-shaped bracket 32, integral with brackets 14, into engagement with an extension 33 on arms 28.

Figure 4:
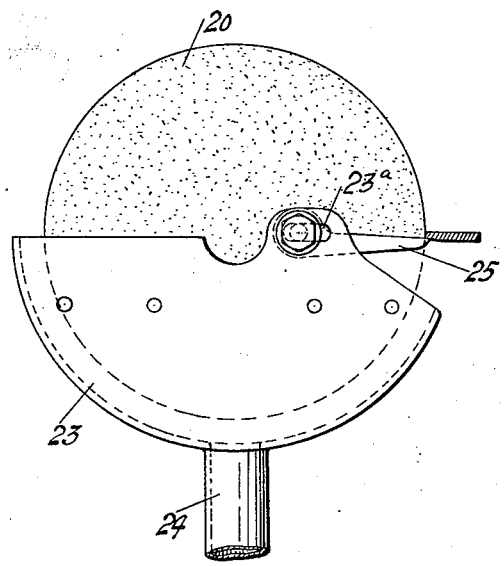
Figure 4 is a detail section illustrating the cooperation of the helical blade with the grinder.
Figure 5:
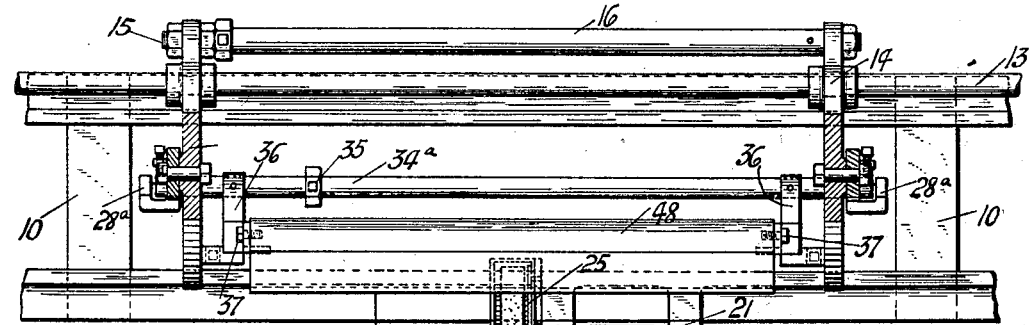
Figure 5 is a plan illustrating the device with a straight cutter blade therein.
Figure 6:
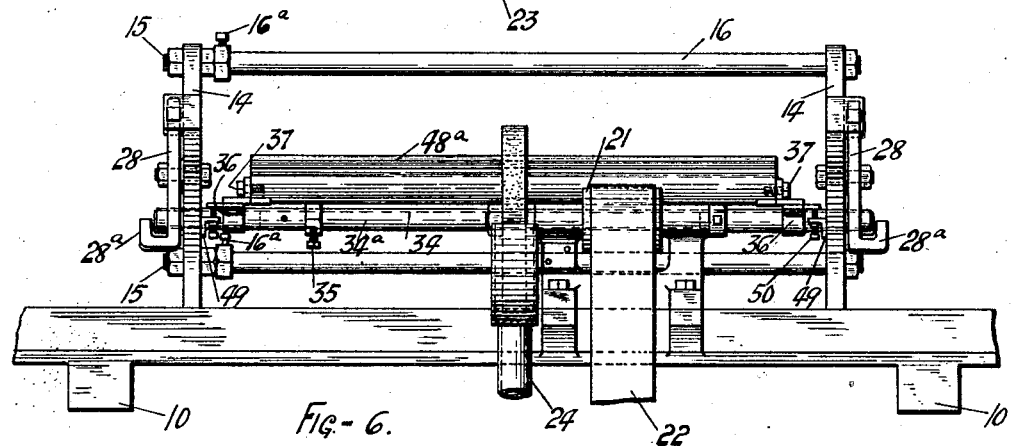
Figure 6 is a rear elevation thereof.
Figure 7:
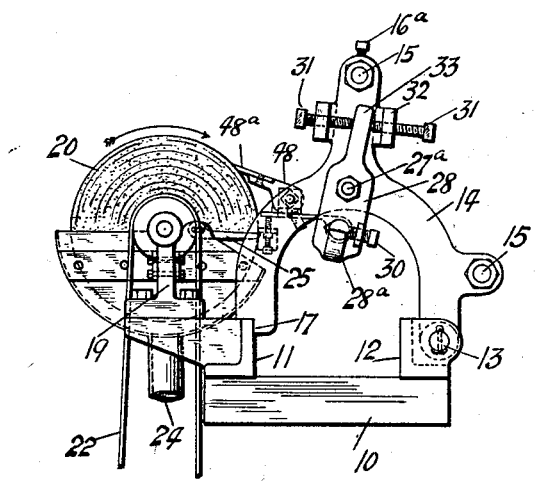
Figure 7 is an end elevation thereof.

The operation of the device for grinding rotary cutters may now be described. The cutter carrying frame is swung back off of bar 11. Set screws 16ª, 16ª are loosened to separate brackets 14 sufficiently to insert the ends of the cutter spindle in apertures 29 and are moved together until portions 28ª on arms 28 just engage the ends of the spindle, whereupon set screws 16ª, 16ª are tightened. Set screws 30 are adjusted to properly position the spindle for smooth rotation in arms 28. The frame is then swung down onto bar 11 and screws 31 are so adjusted as to present the cutter blade to grinder 20 and on rest 25 in the manner shown in Figure 4. Grinder 20 is then driven in the direction of the arrow, thus by friction on the blade causing it to hug rest 25. The frame is then moved back and forth until the blade is sharpened, the cutter being caused to rotate by engagement of the blade with the grinder and rest so that the edge of the blade will be presented to grinder 20 throughout its length. After the first blade is sharpened, the frame may be swung back, the cutter turned and the frame again brought down on bar 11 so that another blade is engaged on rest 25, whereupon the above described sharpening operation is repeated and so on until all the blades are sharpened.

It is desirable to provide means whereby the straight blade of a mower may be sharpened in the device. The present invention has devised an attachment whereby the various adjusting instrumentalities described above may be employed for this purpose. This attachment comprises an adjustable rod comprising a rod 34 telescoping into a sleeve 34ª having a set screw 35 thereon, the rod being adapted to be secured in apertures 29 of arms 28 as will be understood. On the rod including parts 34 and 34ª there is provided a pair of pivoted brackets 36, 36 having screws 37, 37 therein for engaging in the ends of a cutter bar, indicated at 48, having the straight cutter 48ª thereon. The cutter bar 48 is thus pivotally mounted on rod 34, 34ª. Brackets 14 have thereon lugs 49 through which are threaded set screws 50 adapted to engage under and support brackets 36 to position cutter 48ª at any desired inclination to grinder 20 to sharpen the cutter with the desired beveled edge. Arms 28 may be adjusted to position the cutter 48ª toward and from grinder 20.

The mounting of the cutter bar attachment above described into the frame while swinging back off of bar 11 and the adjustment thereof, as will be understood from the foregoing, may be accomplished after the frame has been swung back on bar 11, set screws 31 and 50 being adjusted for this latter purpose.

It will appear from the foregoing that a simple effective construction has been provided for being readily adjusted to receive and sharpen rotary mower cutters and a simple, effective attachment has been provided, adapted to be received in the above construction and readily adjusted to support a straight cutter therein for grinding.

Modifications of the invention may be resorted to without departing from the spirit thereof or the scope of the appended claim.

What is claimed is:

A sharpener for lawn mowers, comprising a rotary grinder, a work rest adjacent thereto, a frame slidable longitudinally with respect to the grinder, said frame including relatively adjustable end brackets, a rod on which one side of the frame is pivoted and slidable, a bar on which the free side of the frame is slidable in operative relation to the cutter, an arm pivoted on each bracket, said arm having an aperture therein and means cooperating therewith to rotatively receive the spindles of rotary cutters, and means for adjusting said arms from and toward the grinder to position blades of said rotary cutters against said grinder and on said rest.

EDGAR EBERHART.